United States Patent [19]

McCulloch et al.

[11] Patent Number: 5,137,370
[45] Date of Patent: Aug. 11, 1992

[54] THERMORESISTIVE SENSOR SYSTEM

[75] Inventors: Reginald W. McCulloch, Knoxville; Omar Garcia, Oak Ridge, both of Tenn.

[73] Assignee: Delta M Corporation, Oak Ridge, Tenn.

[21] Appl. No.: 675,757

[22] Filed: Mar. 25, 1991

[51] Int. Cl.$^5$ ............................ G01K 7/10; G01F 23/24
[52] U.S. Cl. ........................................ 374/173; 374/164;
    374/183; 73/295; 364/557
[58] Field of Search .................... 73/290 R, 295; 374/3,
    374/10, 44, 45, 133, 163, 164, 183, 185, 139,
    141; 340/622; 364/557, 571.03

[56] References Cited

U.S. PATENT DOCUMENTS

| | | | |
|---|---|---|---|
| 3,283,576 | 11/1966 | Halpin et al. | 73/295 |
| 3,302,458 | 10/1068 | Scadron | 72/295 |
| 3,479,875 | 11/1969 | Riddel | 73/295 |
| 3,613,454 | 10/1971 | McFadin | 374/185 |
| 3,678,749 | 7/1972 | Harper | 73/304 |
| 3,750,155 | 7/1973 | Oman | 374/185 X |
| 4,102,199 | 7/1978 | Tsipouras | 73/362 |
| 4,114,446 | 9/1978 | Walsh | 374/173 |
| 4,209,837 | 6/1980 | Brown | 364/117 |
| 4,326,199 | 4/1982 | Tarpley et al. | 340/622 |
| 4,356,728 | 11/1982 | Gomez | 73/295 |
| 4,449,404 | 5/1984 | Bohme et al. | 73/295 |
| 4,479,190 | 10/1984 | Takai et al. | 364/556 |
| 4,513,617 | 4/1985 | Hayes | 73/313 |
| 4,556,330 | 12/1985 | Regtien | 374/185 |
| 4,588,308 | 5/1986 | Saito | 374/181 |
| 4,590,797 | 5/1986 | Beaubatie et al. | 73/295 |
| 4,602,871 | 7/1986 | Hanaoka | 374/102 |
| 4,609,292 | 9/1986 | Asano et al. | 364/571 |
| 4,609,913 | 9/1986 | Arbogast et al. | 340/622 |
| 4,713,783 | 12/1987 | Fletcher | 364/557 |
| 4,771,393 | 9/1988 | Ishida et al. | 364/557 |
| 5,031,126 | 7/1991 | McCulloch et al. | 73/295 X |

Primary Examiner—William A. Cuchlinski, Jr.
Assistant Examiner—G. Bradley Bennett
Attorney, Agent, or Firm—Luedeka, Hodges, Neely & Graham

[57] ABSTRACT

A thermoresistive sensor system compensates for ambient temperature of a medium. First and second side-by-side sensors are mounted in the medium, each having a resistance that varies with temperature change in the medium. A thermal compensation control circuit supplies current to the first sensor such that the cube of its current times its resistance ($I_1^3 \times R_1$) is constant. The control circuit supplies current to the second sensor at a multiple of the current through the first sensor. A signal based upon the voltages across each sensor is produced as a temperature compensated output. In this manner, the system automatically compensates for temperature changes in the medium which would otherwise degrade the accuracy of the output.

12 Claims, 4 Drawing Sheets

THERMORESISTIVE SENSOR SYSTEM

BACKGROUND OF THE INVENTION

This invention relates to thermoresistive sensor systems and specifically to those sensor systems that compensate for changes in ambient temperature. In the preferred application, this invention relates to measuring a liquid level with a thermoresistive sensor system which compensates for changes in temperature of a medium.

It is well known in the art to use thermoresistive sensors for monitoring parameters such as flow or level of a medium. For example, a resistive sensor may be heated and the resistance of the sensor may be measured to determine changes in heat transfer conditions around the sensor. This change is used to determine the flow or level of a medium. In such systems, changes in the temperature of the medium will cause the sensor resistance to increase or decrease, thus, affecting the measurement and potentially causing an error.

One solution to this potential error is to maintain constant power on a first of two sensors that are mounted side-by-side in the medium. A current is supplied to the second sensor which is at a ratio of the current through the first sensor. The voltages across the first and second sensors are processed to an output. This output is representative of the changes in the medium, such as a change in the level of a liquid in the medium or a change in the flow of the medium. This constant power source system partially compensates for changes in the medium temperature, and works well where temperature variation in the medium is small.

The following mathematics show the partial compensation of a constant power system. Assuming no self heating of the first sensor, the resistances of the first and second sensors are approximated by:

$$R_1 = R_0(1 + \alpha \Delta T_a) \quad (1)$$

$$R_2 = R_0(1 + \alpha \Delta T_a + \alpha \Delta T_q) \quad (2)$$

where
$R_0$ is the resistance of the censors at 0° C.,
$\alpha$ is the temperature co-efficient of resistance of the sensor material,
$\Delta T_a$ is the difference between $T_0$, which is 0° C., and the temperature of the medium, and
$\Delta T_q$ is the difference between $T_a$ and the temperature of the second probe.

For a sensor that is self-heated, that is heated by applying a current through it, the surface heat flux of that sensor is given by:

$$q'' = h \Delta T_q \quad (3)$$

where
$q''$ is the surface heat flux and
$h$ is the thermal heat transfer coefficient of the sensor. In terms of power supply to the sensor $$q'' = \frac{I^2 R}{A} \quad (4)$$

where I is the current through the sensor and
A is the surface area of the sensor. By combining equations 3 and 4 $\Delta T_q$ is given by equation $$\Delta T_q = \frac{I^2 R}{Ah} \quad (5)$$

In order to determine the $\Delta T_q$ of the sensor without knowing its resistance due to the self heating of the sensor, R of equation 5 is replaced with equation 2 whereby $\Delta T_q$ is then given by $$\Delta T_q = \frac{I^2 R_0}{Ah} \times \frac{(1 + \alpha \Delta T_a)}{\left(1 - \frac{I^2 R_0 \alpha}{Ah}\right)} \quad (6)$$

The resistance of a sensor in terms of its thermal resistive properties can now be determined by substituting equation 6 into equation 2 which gives $$R = \frac{R_0(1 + \alpha \Delta T_a)}{\left(1 - \frac{I^2 R_0 \alpha}{Ah}\right)} \quad (7)$$

equation 7 can be simplified by using the approximation $$\frac{1}{1-x} \simeq 1 + x \quad (8)$$

which is true when X is small. Then the resistance of the sensor which is self-heated is given by $$R = R_0(1 + \alpha \Delta T_a)\left(1 + \frac{I^2 R_0 \alpha}{Ah}\right) \quad (9)$$

A self-heating current $I_2$ is passed through the second sensor and the first sensor receives a current $I_1$ which is a fraction of the second sensor's current $I_2$. This current $I_1$ is insufficient to cause significant self-heating of the first sensor. Thus, self-heating in the first sensor may be ignored for present purposes. The voltage across the first sensor $V_1$ is then amplified by the ratio of the two currents $I_1$ and $I_2$. The voltages across the two sensors can be developed from equation number 9. The difference between these two voltages is represented by $$\Delta V = \left(\frac{I_1^3 R_0^2 \alpha}{Ah}\right)(1 + \alpha \Delta T_a) \quad (10)$$

This is approximately what the difference in sensor voltages will be.

Now because constant power is maintained in the first sensor, it follows that:

$$I_0^2 R_0 = I_1^2 R_1 \quad (11)$$

Thus, $$I_1 = I_0(1 + \alpha \Delta T_a)^{-\frac{1}{2}} \quad (12)$$

and substituting equation 12 into equation 10, $\Delta V$ is equal to $$\Delta V = \frac{I_0^2}{Ah}(1 + \alpha\Delta T_a)^{-\frac{1}{2}} \qquad (13)$$

Equation 13 indicates that constant power to compensate for temperature drift of the medium is not a full compensation, since $\Delta V$ is dependent to some extend upon $\Delta T_a$ which is the difference between the medium temperature and initial temperature.

More precise temperature compensation may be needed in some applications and it is provided by the present invention.

SUMMARY OF THE INVENTION

The present invention provides a thermoresistive sensor system for determining the thermal properties of a medium surrounding two sensors while compensating for the changes in ambient temperature of the medium. A thermal compensation control circuit provides two currents, one ($I_1$) to a first sensor having a resistance ($R_1$) and the other ($I_2$) to a second sensor having a resistance ($R_2$). The sensors are mounted side-by-side in a medium to monitor its thermal properties. The current ($I_1$) through the first sensor is supplied by the thermal compensation control circuit such that $I_1^3 R_1$ is held constant. The thermal compensation control circuit supplied current to the second sensor in an amount equal to a constant multiplied by the current through the first sensor. The voltages across the first and second sensors are supplied to an output circuit that produces, in response to the voltages, an output signal representative of heat transfer conditions of the medium, such as the level of the medium. In the preferred output circuit, the voltage across the second sensor is multiplied by a gain (for example 2) equal to the inverse of the constant (for example 0.5), and this multiplied voltage is compared to the voltage across the first sensor. Preferably, this comparison is performed by providing the two voltages to the inputs of an amplifier whose output corresponds to the difference in the voltages multiplied by a gain and constitutes the output signal. In this manner, the output signal minimally varies with the changes in the temperature of the medium.

The mathematics below show that supplying a constant $I_1^3 R_1$ will more fully compensate for changes in the temperature of the medium than supplying a constant $I_1^2 R_1$. The difference between the multiplied voltage from the second sensor and the voltage of the first sensor is closely approximated by equation 10.

$$\Delta V = \left(\frac{I_1^3 R_0^2 \alpha}{Ah}\right)(1 + \alpha\Delta T_a) \qquad (10)$$

By maintaining $I_1^3 R_1$ constant (K), it is shown that $$I_0^3 R_0 = I_1^3 R_1 \qquad (14)$$

And, $I_1$ is closely approximated by Equations 15.

$$I_1 = I_0(1 + \alpha\Delta T_a)^{-\frac{1}{3}} \qquad (15)$$

Substituting equation 10 into equation 15 $\Delta V$ is approximated by:

$$\Delta V = \frac{I_0^3 R_1^2 \alpha}{Ah} \qquad (16)$$

Therefore, the difference in the multiplied voltage of the second sensor and the voltage of the first sensor is highly independent of change in ambient temperature $\Delta T_a$ and represents a temperature compensated measurement of heat transfer properties of the medium in which the sensor system is mounted. For example, $\Delta V$ may represent level or flow of the medium.

Other objects and advantages of the invention will be apparent from the following description, the accompanying drawings and the appended claims.

DETAILED DESCRIPTION OF THE PREFERRED EMBODIMENT

Figure 1:
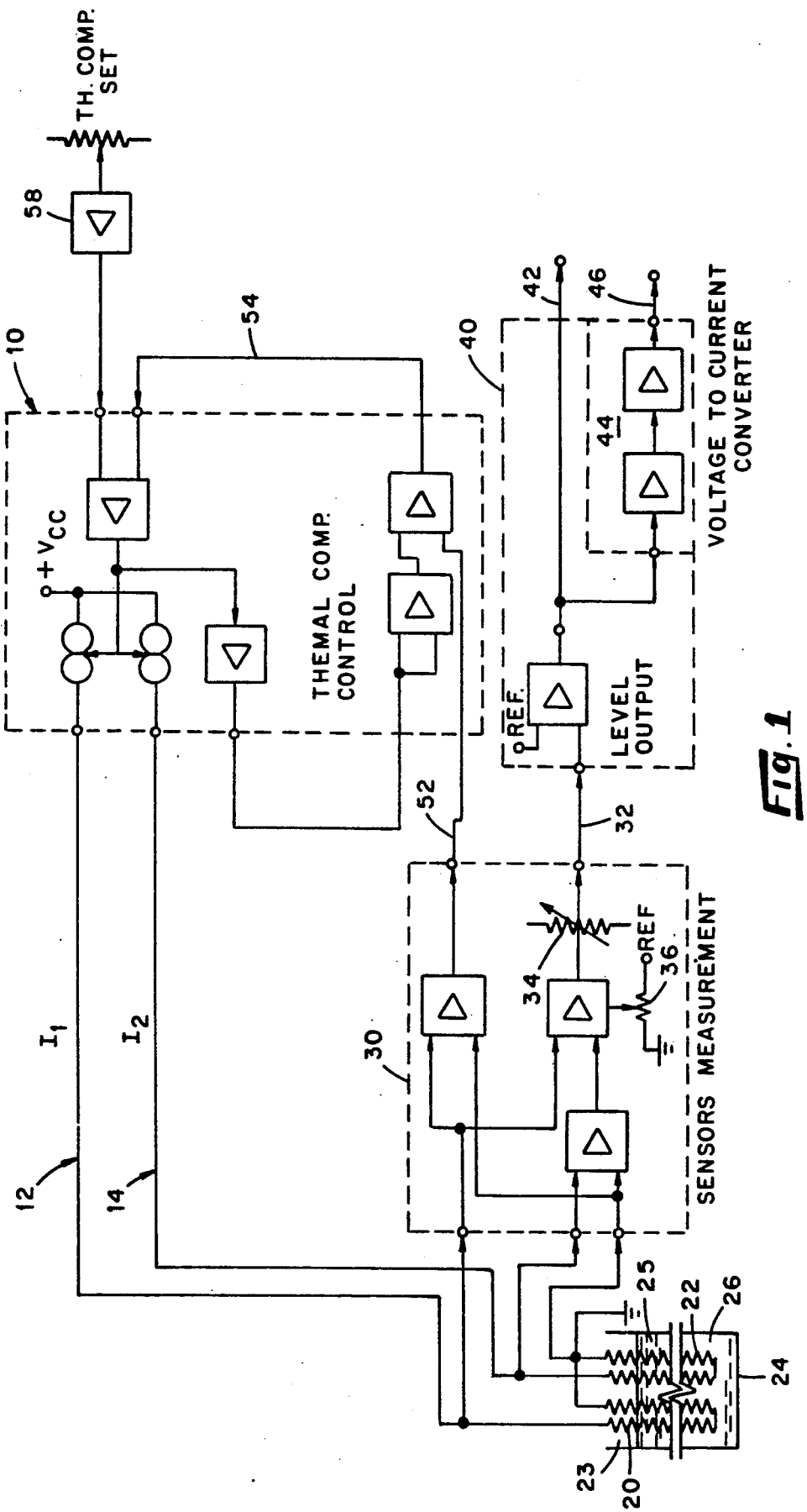
FIG. 1 is a block diagram of the thermoresistive sensor circuit including a measurement circuit, output circuit and thermal compensation circuit.

Referring now to the drawings there is shown in FIG. 1 a block diagram of a thermoresistive sensor system for measuring the thermal properties of a medium. The system includes a thermal compensation control 10 which provides a current $I_1$ through line 12 to a sensor 20 having a resistance of $R_1$, such that $I_1^3 R_1$ is held constant (k). The thermal compensation control 10 also provides a current $I_2$ through line 14 to sensor 22 having a resistance of $R_2$. This current is maintained at a fixed multiple (C), which could be $>1$ but is preferably about 0.5, of the current $I_1$ through the sensor 20. That is, $I_2 = 0.5 I_1$.

Sensors 20 and 22 are mounted in a sample chamber 24 containing a medium 26 whose thermal properties, such as temperature, change within a known range. For example, the medium 26 may be a gas 23 and liquid 25 whose level varies within the chamber 24 thereby changing the overall thermal properties of the medium 26. Both sensors 20 and 22 have resistances that change with temperature change.

At a constant temperature in the sample chamber 24, a change in the thermal properties of medium 26 will cause a change in the temperature of the second sensor 22. For example, when the heat transfer coefficient of the medium 26 increases, such as when liquid medium level rises, the resistance of first sensor 20 decreases because more energy is absorbed by the medium 26 and the temperature of sensor 22 decreases. If the current $I_1$ remained constant, the voltage $V_1$ across the first sensor 20 would decrease. However, with the thermal compensation control 10 changing the current $I_1$ to maintain a constant (k) $= I_1^3 R_1$ the current $I_1$ will increase at a slower rate than the resistance $R_1$ decreases since $I_1$ is equal to $(k/R_1)^{\frac{1}{3}}$. The voltage $V_1$ on the other hand will decrease because $V_1 = I_1 R_1$ and, even though the current $I_1$ increases, it does not increase enough to keep up with the decrease in resistance $R_1$. Likewise if the heat transfer coefficient of the medium 26 decreases, the resistance $R_1$ will increase, the current $I_1$ will decreases and the voltage $V_1$ will increase.

Changes in the temperature of the medium 26 will also affect the resistance $R_1$ and voltage $V_1$ across sensor 20. Again, if there were no change in the current $I_1$ supplied to sensor 20, when the temperature of the medium 26 increases, the resistance $R_1$ and the voltage $V_1$ of the first sensor 20 will increase because the thermal coefficient of resistance ($\alpha$) of the probe is positive. With the thermal compensation control 10 changing current $I_1$ to maintain $I_1^3R_1$ constant (k), the current will decrease at a slower rate than the resistance $R_1$ increases, again, because $I_1$ is equal to $(k/R_1(^{\frac{1}{3}})$. The voltage $V_1$ will increase because the current $I_1$ decreases at a slower rate than the resistance $R_1$ increases. Likewise, if the temperature of the medium 26 decreases, the resistance will decrease, the current $I_1$ will increase and the voltage $V_1$ will decrease.

The same changes occur to the resistance $R_2$, current $I_2$ and the voltage $V_2$ of the second sensor 22 when the heat transfer coefficient or the temperature of the medium 26 changes. The increases and decreases of the current $I_2$ and voltage $V_2$ will occur at a different degree compared to $I_1$ and $V_1$, since the current $I_2$ is equal to the current $I_1$ multiplied by a constant (C).

The voltages $V_1$ and $V_2$ across first sensor 20 and the second sensor 22 are measured and processed by the sensor's measurement circuit 30. The sensor's measurement circuit 30 outputs a signal on line 32 within a desired voltage range representing, in this example, the level of the medium 26. Potentiometer 36 is used to adjust the signal on line 32 to a minimum, preferably 0 volts when the medium 26 is at maximum level. Potentiometer 4 is used to adjust the signal on line 32 to a maximum, preferably 2.5 v., when the medium 26 is at a minimum level in chamber 24. These adjustments are made to insure accurate readings throughout a desired range whose extremes are defined by a sample chamber 24 that is full of liquid 25 and an empty sample chamber 24.

The signal on line 32 is applied to an output circuit 40 which produces a voltage signal on line 42 whose voltage amplitude represents heat transfer conditions of the medium 26, for example, the level of liquid 25. Preferably, the voltage signal on line 42 is converted from voltage to current by converter 44 which produces a current signal on line 46 whose current amplitude represents the aforementioned heat transfer conditions. These voltage and current signals are produced for monitoring equipment.

The thermal compensation control circuit 10 receives the voltage $V_1$ from the first sensor 20 on line 52 and uses the voltage $V_1$ to maintain the current $I_1$ supplied to the first sensor 20 such that $I_1^3R_1$ is constant. Based upon this signal on line 52, the thermal compensation control 10 produces the currents on lines 12 and 14 for the first 20 and second 22 sensors.

A thermal compensation set 58 maintains the constant (k) $I^3R$ within a predetermined range by setting a limit. Therefore, $I^3R_1$ cannot exceed the predetermined limit set by the thermal compensation set 58. This assures that the circuits of the thermoresistive sensor system do not operate outside their thresholds.

Figure 2:
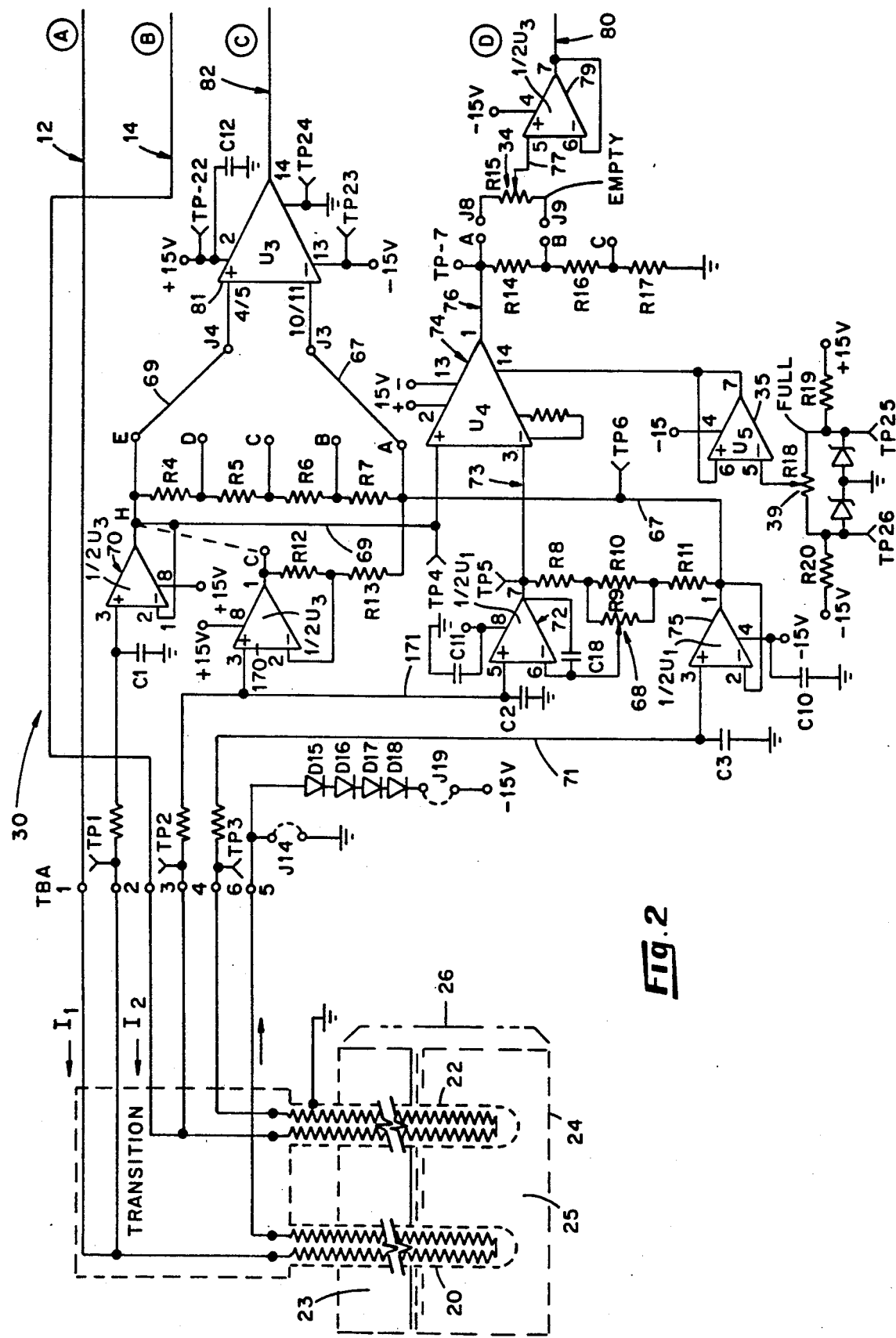
FIG. 2 is a schematic diagram of the measurement circuit.

Now referring to FIG. 2 there is shown a circuit diagram of the thermoresistive sensor's measuring circuit 30. The thermal compensation control 10 (FIG. 1) supplies the current $I_1$ to the first sensor 20 through line 12, and supplies a current $I_2$ to the second sensor 22 through line 14. Current $I_2$ is equal to current $I_1$ multiplied by a constant (C), such as 0.5, which is represented by: $I_2 = CI_1$. The thermal compensation control 10 (FIG. 1) will be discussed in more detail below.

As stated above, the resistances $R_1$ and $R_2$ of the first 20 and second 22 sensors will vary with the changes in the temperature and the heat transfer coefficient of the medium surrounding the sensors 20 and 22 and the currents $I_2$ and $I_1$, and voltages $V_1$ and $V_2$ will vary according to the changes in resistances $R_1$ and $R_2$ with $I_1^3R_1$ remaining constant. The first sensor's 20 signal $I_1R_1$ is input into operational amplifier 70 which buffers the signal $I_1R_1$ and outputs it on line 69. The signal on line 69 is fed into instrumentation amplifier 81. The output of the amplifier 81 is the voltage $V_1$ across the first sensor 20. The second sensor's 22 signal represented by $I_2R_2$, is input into operational amplifier 72. The gain (G) of operational amplifier 72 is set such that the gain is approximately equal to the inverse of the fixed constant (C). This gain (G) is approximately equal to the first sensor's 20 current $I_1$ divided by the second sensor's 22 current $I_2$ since the constant (C) is equal to $I_1$ divided by $I_2$:

$$G \approx \frac{1}{c} \quad (17)$$

$$G \approx \frac{I_1}{I_2} \quad (18)$$

The adjustment of gain (G) through potentiometer 68 is also used to compensate for the difference of the resistances between $R_1$ and $R_2$ of the sensors at an expected temperature of operation. The length of the sensors 20 and 22 is dependant upon what size chamber is used to contain the medium or what type of monitoring is needed. The sensors 20 and 22 will have slightly different resistances at an initial temperature even though they are the same length. The amplifier 72 is set such that the actual gain (G) is equal to the constant C, which is $I_1$, divided by $I_2$, multiplied by the ratio of the expected resistances, $R_{1e}$ divided $R_{2e}$, at the expected temperature of operation; this gain (G) is represented by:

$$G = \frac{I_1}{I_2} \times \frac{R_{1e}}{R_{2e}} \quad (19)$$

The actual adjustment is set on potentiometer 68 by measuring the voltage input into amplifier 72 on line 171 and measuring the output on line 73 using the common on line 67 as a reference. The gain of amplifier 72 is thereby physically set to G.

The output of amplifier 72 ($V_G$) on line 73 is equal to the gain (G) multiplied by the voltage $V_2$ of the second sensor (Equation 19).

$$V_G = GV_2 \quad (20)$$

Equation (20) is algebraically equal to the current of the first sensor 20 multiplied by the resistance of the second sensor 22 (Equation 21) since the gain (G) is approximately equal to current $I_1$ divided by current $I_2$ and the voltage $V_2$ is equal to $I_2R_2$:

$$V_G = I_1R_2 \quad (21)$$

A return signal on line 71 from both sensors 20 and 22 is applied to an operational amplifier 75, which is used as a buffer. The output of operational amplifier 75 is used as a common to sink the current through R8, R10, and R11 and to sink the current through R4, R5, R6 and R7. This common is used by operational amplifier 72 and instrumentation amplifier 81. The signal $V_1$ from amplifier 70 on line 69, is fed into instrumentation amplifier 74 along with the output of amplifier 72 which is $V_G$ on line 73. The difference $\Delta V$ between the inputs $V_G$ and $V_1$ into amplifier 74 is represented by equation 22:

$$\Delta V = \left(\frac{I_1^3 R_0^2 \alpha}{Ah}\right)(1 + \alpha \Delta T_a) \quad (22)$$

Equation 21 is closely approximated by equation 23:

$$\Delta V = I_1 \Delta R \quad (23)$$

where $\Delta R$ is the difference between $R_1$ and $R_2$ with the thermal compensation control circuit supplying currents $I_1$ and $I_2$ to both sensors 20 and 22.

The gain ($G_2$) of amplifier 74 is determined by the resistance of R13. The resistance of R13 depends upon the desired output of the thermoresistive sensor system. The output of amplifier 74, derived from Equation 21, is the difference $\Delta R$ between the resistances $R_1$ and $R_2$ of the two sensors 20 and 22 multiplied by the current $I_1$ through the first sensor 20 multiplied by the gain $G_2$ of amplifier 74. This is represented by:

$$V_T = G_2 I_1 \Delta R \quad (24)$$

$V_T$ is the differences in said voltages $\Delta V$ multiplied by gain $G_2$.

A full adjust circuit 36 sets the output of amplifier 74 on line 80 to a minimum, preferably 0 volts, when the liquid 25 level in chamber 24 surrounding the sensors 20 and 22 is at a maximum. The potentiometer 39 inputs a signal into operational amplifier 35 ranging from $-5$ volts to 5 volts. Amplifier 35 buffers the signal and inputs the signal on pin 14 of amplifier 74. This signal will control the magnitude of output on line 76 of amplifier 74.

The output on line 76 passes through an empty adjust circuit 34. The empty adjust circuit 34 is used to set the signal on line 77 to a maximum voltage, which is preferably 2.5 volts, when the liquid 25 level surrounding the sensors 20 and 22 is at a minimum. Jumpers J8 and J9 are used to set the empty adjustment. One of these Jumpers J8 or J9 are jumped to points A, B, or C which changes the path of the signal $V_1$ on line 76. The voltage $V_1$ is set to pass through resistors R14 at point B or R16 at point C or no resistance at point A. Each resistor R14 or R16 drops a different voltage which provides a wide range to ensure that the empty adjust will be the desired maximum voltage, preferably 2.5 volts.

Once the range of the signal is set, an operational amplifier 79 buffers the signal on line 77 and outputs a level signal on line 80. The level signal range being between 2.5 volts and 0 volts provides an accurate measurement of the various levels of the medium.

Figure 3:
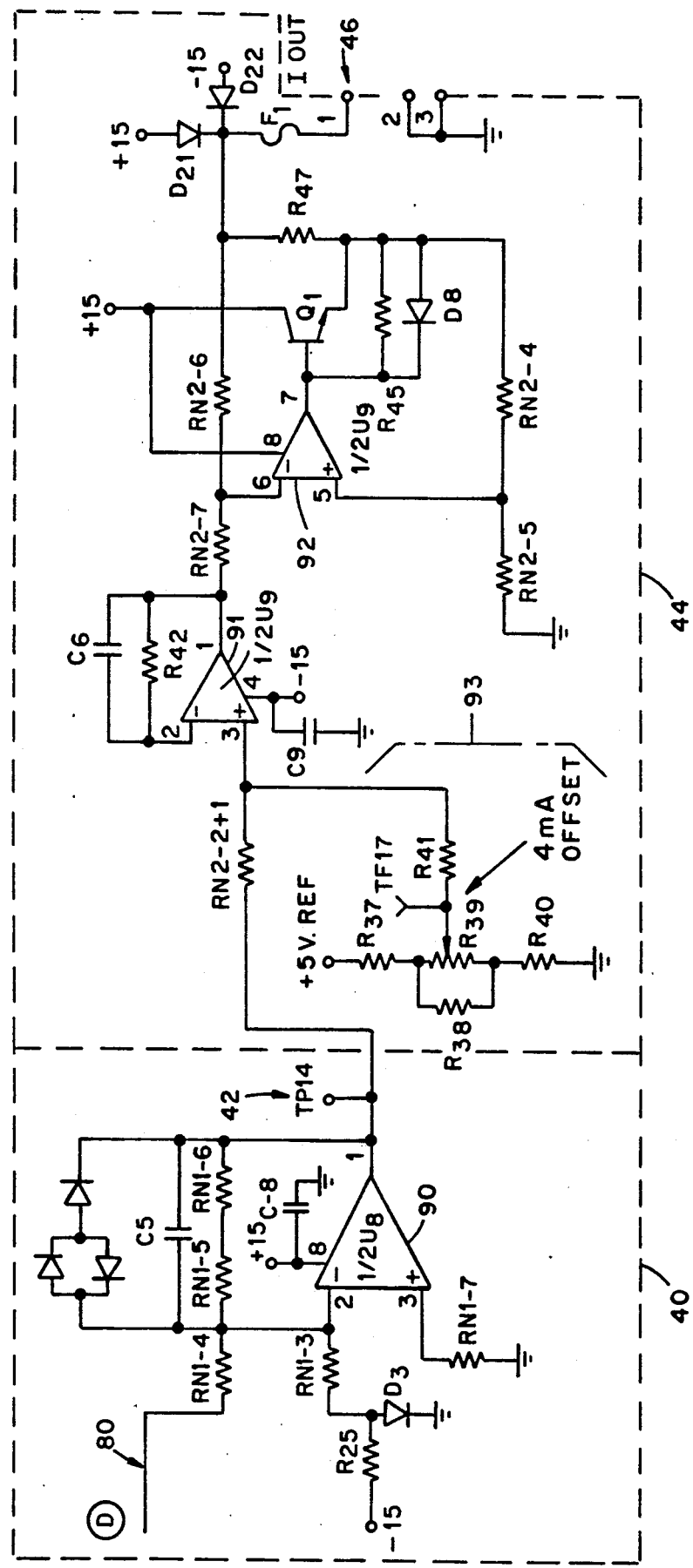
FIG. 3 is a schematic diagram of the level output circuit.

Now referring to FIG. 3, there is shown the level output circuit 40. The level signal on line 80 is inverted and amplified by the operational amplifier 90 so that the empty signal at 2.5 volts is now 0 volts and the full signal at 0 volts is now 5 volts. The output of the operational amplifier 90 on line 42 can be used by monitoring equipment that measures voltage change to display the thermal properties of the medium 26.

Preferably, the voltage level signal on line 42 is input into a voltage to current converter 44. The voltage to current converter 44 receives the voltage level signal on line 42 and inputs the signal into operational amplifier 91 then into operational amplifier 92. An offset circuit 93 is provided to set the empty state to a minimum current, preferably 4mA. The output on line 46 is a current signal which has a preferable range of 4 mA for empty to 20 mA for full. This range is the most widely used range by monitoring equipment to display the level output signal representing the thermal properties of the medium 24.

Figure 4:
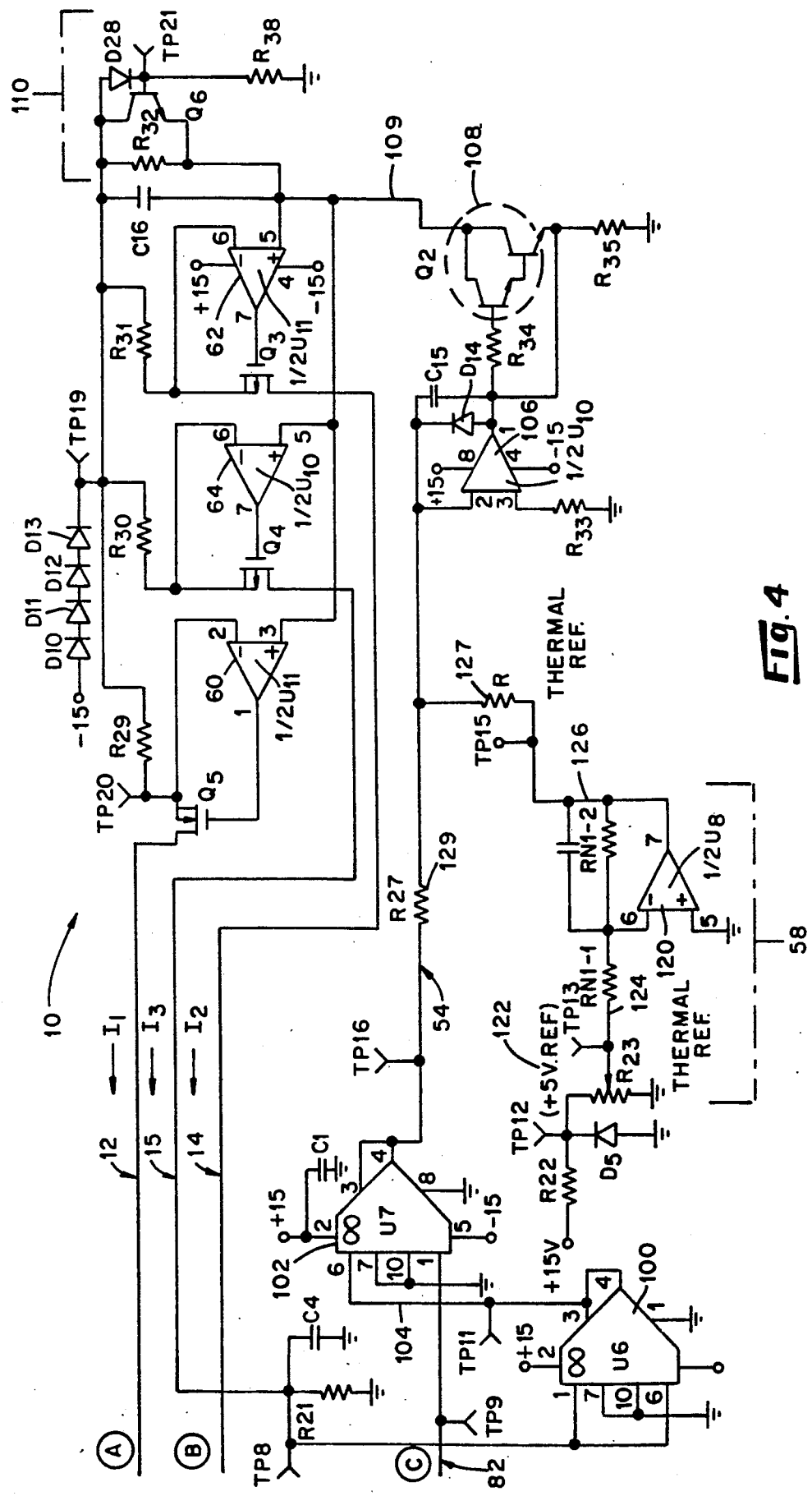
FIG. 4 is a schematic diagram of the thermal compensation circuit.

Referring to FIG. 4 there is shown the thermal compensation control 10 that is used to maintain the constant $I^3R$. The thermal compensation circuit 10 has three current sources. The first current source 60 supplies the current $I_1$ to the first sensor 20 on line 12. The second current source 62 supplies the current $I_2$ to the second sensor 22 on line 14. The third current source 64 supplies a current $I_S$ to an analog multiplier 100 on line 15. The analog multiplier 100 takes the voltage ($V_S$) across R21, which is created by current $I_S$ from line 15, representing the magnitude of the current $I_S$, and multiplies the voltage $V_8$ by itself to obtain an output $V_S^2$ on line 104 equal to magnitude of $I_S^2$. The multiplier 100 outputs the magnitude of $I_S^2$ to a second analog multiplier 102. The second multiplier 102 also receives the voltage $V_1$ signal from the first sensor 20 on line 82. The voltage $V_1$, which equals $I_1 R_1$, and the magnitude signal $I_S^2$ are multiplied together by multiplier 102. The output, on line 54, of multiplier 102 is $I_1^3 R_1$. This is represented by:

$$V_c = I_1^3 R_1 \quad (25)$$

The signal on line 54, which is $V_c$, drives operational amplifier 106. This amplifier 106 drives the Darlington transistor pair 108 to sink the current on line 109 that is proportional to the signal on line 54, which represents $I_1^3 R_1$.

Clamping circuit 110 provides a maximum voltage preferably 1.2 volts, on line 109 that overrides the Darlington transistor pair 108 when the Darlington transistor 108 tries to allow a voltage on line 109 that is greater than the predetermined maximum voltage. Current sources 60, 62 and 64 receive the voltage on line 109 which controls the gates of FETs Q3, Q4, and Q5. FETs Q3, Q4 and Q5 provide a current output control for $I_1$, $I_2$ and $I_s$. With the feedback described above $I_1$ is maintained at a magnitude such that $I_1^3 R_1$ is held constant.

The currents $I_1$ and $I_2$ are set, as stated above, such that $I_2 = CI_1$. This ratio is determined by the resistances of $R_{29}$ and $R_{31}$. For example, if a ratio of 1 to 0.5 is desired, such that $I_2 = 0.5\ I_1$, then $R_{29}$ should equal 5 ohms and $R_{31}$ should equal 10 ohms.

A thermal reference circuit 58 is provided to adjust the magnitude of the voltage appearing at the input of amplifier 106. The thermal reference has operational amplifier 120 which has an input from potentiometer 122. The potentiometer 122 produces a voltage signal on lines 124 at a fraction of 5 volts. The amplifier 120 receives this voltage on line 124 into its inverting input and produces a negative voltage on line 126 that is equal in magnitude to the positive voltage on line 124. Thus, by adjusting potentiometer 122, one may adjust the voltage on line 126 which, in turn, adjusts the voltage at the input of amplifier 106. For example, if voltage on line 126 decreases (becomes more negative), the total voltage drop across resistors 129 and 127 increases and, thus, the voltage at the junction of resistors 127 and 129 decreases.

Referring, again, to FIG. 1 it is appreciated that, maintaining the current to the first sensor 20 such that $I_1^3 R_1$ remains constant (K), the changes in the ambient temperature of a medium will not appreciably affect the level reading. For example, if the ambient temperature increases around the sensors the resistance $R_1$ and $R_2$ will increase and the thermal compensation circuit 10 adjusts the current $I_1$ to the first sensor 20 such that $I_1^3 R_1$ will remain constant. The thermal compensation control circuit 10 also maintains:

$$I_2 = C I_1 \qquad (26)$$

This function is accomplished by continuous feedback of the voltage $V_1$ across the first sensor 20 to the thermal compensation control circuit 10 to control the current sources 60, 62, and 64 shown in FIG. 4. This provides compensation for any changes in resistances $R_1$ and $R_2$ due to the changes in the temperature of the medium surrounding sensors 20 and 22.

The function of the analog circuitry for the thermoresistive sensor system disclosed in the above discussion and drawings may also be performed by digital circuitry.

While the form of apparatus herein described constitutes a preferred embodiment of this invention, it is to be understood that the invention is not limited to this precise form of apparatus, and that changes can be made therein without departing from the scope of the invention which is defined in the appended claims. For example, if desired, the voltage $V_2$ could be used as a feedback voltage to compensation control 10 so that $I_1^3 R_2$ is held constant. To illustrate this possibility, amplifier 170 is shown and, to implement this variation, the output of amplifier 170 would be connected to line 69 and amplifier 70 would be disconnected.

What is claimed is:

1. A thermoresistive sensor circuit for determining thermal properties of a medium while compensating for changes in the ambient temperature of the medium comprising:
    a first sensor for being mounted in the medium, said first sensor having a resistance that varies with temperature;
    a second sensor for being mounted in the medium, said second sensor having a resistance that varies with the temperature;
    a thermal compensation control connected for supplying two currents:
    a first current through said first sensor such that $I_1^3 R_1$ of said first sensor is held constant, where $I_1$ is the current through said first sensor and $R_1$ is the resistance of said first sensor, thereby producing a first voltage ($V_1$) across said first sensor;
    a second current through said second sensor, thereby producing a second voltage ($V_2$) across said second sensor; and
    output means connected to detect the voltages of said first and second sensors and for producing an output signal in response to said voltages, said output signal being representative of the thermal properties of the medium.

2. The thermoresistive sensor circuit of claim 1 further comprising:
    said thermal compensation control supplying the second current at a magnitude equal to a constant multiplied by the magnitude of said first current.

3. The thermoresistive sensor circuit of claim 1 wherein said thermal compensation control includes means connected for monitoring $V_1$ and $I_1$, producing a voltage $V_s$ corresponding in magnitude to $I_1$, squaring $V_s$ to produce a signal $V_s^2$ equal to the magnitude of $I_s^2$ and multiplying $V_s^2$ by the $V_1$ to produce a control signal having a magnitude equal to $I_1^3 R^1$.

4. The thermoresistive sensor circuit of claim 1 wherein said thermal compensation control includes means connected for monitoring $V_1$ and $I_1$ for producing a control signal having a magnitude equal to $I_1^3 R_1$, for producing a control voltage $V_c$ and for producing the currents $I_1$ and $I_2$ in response to $V_c$ so that $I_2 = C I_1$.

5. The thermoresistive sensor circuit of claim 4 wherein said thermal compensation control maintains the constant C at a value less than 1.

6. The thermoresistive sensor circuit of claim 4 wherein said thermal compensation control maintains the constant C at a value greater than 1.

7. The thermoresistive sensor circuit of claim 1 wherein said output means further comprises means for multiplying $V_a$ by G, where G is a gain which is approximately equal to $I_1$, divided by current $I_2$, to produce G $V_2$; and
    means for producing the output signal to correspond to $V_1$ minus G $V_2$.

8. The thermoresistive sensor circuit of claim 7 further comprising a means for setting the gain G to compensate for a difference in the resistance $R_1$ and $R_2$ of said first and second sensors at an initial temperature $T_e$.

9. The thermoresistive sensor circuit of claim 1 further comprising means for adjusting said output signal to a desired magnitude when the medium is in a minimum heat transfer condition.

10. The thermoresistive sensor circuit of claim 1 further comprising means for adjusting said output signal to a desired magnitude when the medium is in a maximum heat transfer condition.

11. The thermoresistive sensor of claim 3 wherein said medium comprises a combination of gas and liquid, said first and second sensor being mounted in the gas and liquid to determine the level of liquid.

12. A thermoresistive sensor for determining thermal properties of a medium surrounding the sensor while compensating for changes in the ambient temperature of the sensor comprising:
    a first sensor for being mounted in a medium, said first sensor having a resistance which varies with temperature;
    a second sensor for being mounted in a medium, said second sensor having a resistance which varies with temperature;
    means for mounting said first and second sensors side-by-side in the medium;
    a thermal compensation control connected for supplying two currents:
    a first current ($I_1$) through, and a voltage ($V_1$) across, said first sensor such that $I_3^1 R_1$ of said first sensor is held constant, said constant being given by equation:

$$K = I_1^3 R_1$$

where
    K equals the constant of said first sensor;

$I_1$ is the first current supplied by said thermal compensation control through said first sensor;

$R_1$ equals a resistance of the first sensor at an ambient temperature; and a second current ($I_2$) through, and a voltage ($V_2$) across, said second sensor such that the second current through said second sensor is equal to a fixed multiple multiplied by the first current through said first sensor, said second current being represented by equation:

$$I_2 = CI_1$$

where $I_2$ equals the current supplied by said thermal compensation control through said second sensor;

means for multiplying the voltage ($V_2$) across said second sensor by a gain equal to the reciprocal (1/C) of the constant (C) to produce $V_G$ represented by equation:

$$V_G = GV_2$$

where $V_G$ equals said multiplied voltage;

G equals the gain of the means for multiplying;

means connected for providing a control voltage ($V_s$) for said thermal compensation control to control the currents supplied to said first and second sensors, said voltage represented by equation:

$$V_s = I_1^3 R_1$$

where $V_S$ equals the control voltage for controlling the currents supplied to said first and second sensors;

means connected for producing a control signal from the control voltage for said thermal compensation control to control the currents $I_1$ and $I_2$ delivered to said first and second sensors; and means connected for measuring the difference in the voltages of said first sensor ($V_1$) and said multiplied voltage ($V_G$), said difference in voltages represented by equation:

$$\Delta V = \left( \frac{I_1^3 R_0^2 \alpha}{Ah} \right)(1 + \alpha \Delta T_a)$$

$\Delta V$ equals the difference in voltages of said first sensor and said multiplied voltage ($V_G$);

$I_0$ equals the current through said first sensor at 0° C.;

$R_0$ equals the resistance of said first sensor at 0° C.;

$\alpha$ equals a temperature coefficient of resistance of said first or second sensors;

A equals a surface area of said first or second sensors; and h equals a heat transfer coefficient of said first or second sensors, means connected for producing an output signal corresponding to the difference in voltage $\Delta V$.

* * * * *

UNITED STATES PATENT AND TRADEMARK OFFICE
CERTIFICATE OF CORRECTION

PATENT NO. : 5,137,370
DATED : August 11, 1992
INVENTOR(S) : McCulloch et al.

It is certified that error appears in the above-identified patent and that said Letters Patent is hereby corrected as shown below:

column 3, line 8 delete "extend" and insert ---extent--- therefor;

column 5, line 7 delete "$(K/R_1(^{1/3}$ " and insert --- $(K/R_1)^{1/3}$ --- therefor;

column 5, line 28 after "potentiometer" delete "4" and insert --- 34 --- therefor;

column 7, line 46 after "signal" delete "$V_1$" and insert --- $V_T$ --- therefor;

column 7, line 47 after "voltage" delete "$V_1$" and insert --- $V_T$ --- therefor;

column 8, line 21 after "voltage" delete "$V_8$" and insert --- $V_S$ --- therefor;

column 9, line 35 after "that" delete "$I_1^3 R_2$" and insert --- $I_2^3 R_2$ --- therefor;

column 10, line 25 (Claim 7) after "multiplying" delete "$V_a$" and insert --- $V_2$ --- therefor;

UNITED STATES PATENT AND TRADEMARK OFFICE
CERTIFICATE OF CORRECTION

PATENT NO. : 5,137,370
DATED : August 11, 1992
INVENTOR(S) : McCulloch et al.

It is certified that error appears in the above-identified patent and that said Letters Patent is hereby corrected as shown below:

<u>column 10, line 33</u> (Claim 8) after "temperature" delete "$T_e$" and insert --- $T_o$ --- therefor;

<u>column 10, line 61</u> (Claim 12) after "that" delete "$I_3^1R_1$" and insert --- $I_1^3R_1$ --- therefor;

<u>column 11, line 14</u> after "where" insert the line --- C equals the fixed multiple; --- therefor;

Signed and Sealed this

Nineteenth Day of October, 1993

BRUCE LEHMAN

Attest:

Attesting Officer

Commissioner of Patents and Trademarks